United States Patent
Yamamoto (10) Patent No.: US 9,483,670 B2
(45) Date of Patent: Nov. 1, 2016

(54) RFID TAG WRITING SYSTEM AND METHOD FOR WRITING RFID TAG DATA

(71) Applicant: Toshiba Tec Kabushiki Kaisha, Tokyo (JP)

(72) Inventor: Kenta Yamamoto, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 373 days.

(21) Appl. No.: 13/957,356

(22) Filed: Aug. 1, 2013

(65) Prior Publication Data

US 2014/0035733 A1 Feb. 6, 2014

(30) Foreign Application Priority Data

Aug. 2, 2012 (JP) ................. 2012-171895

(51) Int. Cl.
G06K 7/10 (2006.01)
G06K 1/20 (2006.01)

(52) U.S. Cl.
CPC ............ G06K 7/10009 (2013.01); G06K 1/20 (2013.01)

(58) Field of Classification Search
CPC ............ G06K 7/10207; G06K 7/10198; G06K 7/10217; G06K 7/10227; G06K 1/20

USPC ............ 340/10.1, 10.2, 10.3, 10.33, 10.34, 340/10.4, 10.51, 10.52

See application file for complete search history.

(56) References Cited

U.S. PATENT DOCUMENTS

| | | | |
|---|---|---|---|
| 2002/0070862 A1* | 6/2002 | Francis | G06K 17/00 340/572.1 |
| 2006/0139662 A1 | 6/2006 | Sugiyama | |
| 2008/0074267 A1* | 3/2008 | Sugiyama | 340/572.1 |
| 2009/0253451 A1* | 10/2009 | Trachewsky | 455/509 |
| 2012/0019399 A1* | 1/2012 | Vargo et al. | 340/870.11 |
| 2012/0315894 A1* | 12/2012 | Dussmann | 455/424 |
| 2013/0181838 A1* | 7/2013 | Luke et al. | 340/572.1 |

FOREIGN PATENT DOCUMENTS

JP 2006-181800 7/2006

* cited by examiner

Primary Examiner — Jennifer Mehmood
Assistant Examiner — Yong Hang Jiang
(74) Attorney, Agent, or Firm — Patterson & Sheridan, LLP (57) ABSTRACT

According to one embodiment, a RFID tag writing system has a conveying unit configured to convey a plurality of RFID tags, an antenna configured to transmit a first write signal towards the RFID tags and receive return signals generated by the RFID tags in response to the first write signal, and a controller configured to determine an intensity of a second write signal to be transmitted by the antenna based on intensities of the return signals.

13 Claims, 7 Drawing Sheets

|       | AGC1 | AGC2 |
|-------|------|------|
| Pos 0 | 8    | 3    |

FIG.8

|       | AGC1 | AGC2 |
|-------|------|------|
| Pos 0 | 8    | 3    |
| Pos 3 | 9    | 4    |

FIG.9

|       | AGC1 | AGC2 |
|-------|------|------|
| Pos 0 | 8    | 3    |
| Pos 3 | 9    | 4    |
| Pos 6 | 7    | 0    |

RFID TAG WRITING SYSTEM AND METHOD FOR WRITING RFID TAG DATA

CROSS-REFERENCE TO RELATED APPLICATION

This application is based upon and claims the benefit of priority from Japanese Patent Application No. 2012-171895, filed Aug. 2, 2012, the entire contents of which are incorporated herein by reference.

FIELD

Embodiments described herein relate to an RFID tag writing system configured to write data in an RFID tag and a method for writing data in the RFID tag.

BACKGROUND

An RFID (Radio Frequency Identification) label or tag is advantageously capable of being read and written high-capability data in a non-contact manner and resistant to the influence of dirt and dust. Thus, an RFID technology is continuously used as a substitute for existing barcode technologies.

However, there is a demand to use both barcodes and RFID tags practically in stores. To meet such a demand, an RFID tag writing system is provided which is capable of printing basic commodity data such as a commodity a name, a price, and a barcode on a label and writing the basic data and other detailed data in an RFID tag embedded in the label.

In a conventional calibration carried out in an RFID tag writing system, the setting of an electromagnetic wave transmission power of and an optimal writing position for RFID labels having different features is relatively cumbersome and needs to be manually done by professionals using special tools. Thus, normal users cannot conduct the calibration.

Further, an automatic calibration device is provided to solve the problem above. The device calculates an optimal writing position by conveying RFID labels by a specific feeding distance. However, the feeding of a whole label takes a long time, and the transmission power of an electromagnetic wave and a dynamic range of an AGC (Automatic Gain Control) section at a receiving side are not taken into consideration. Thus, the following problems are encountered.

Even though an optimal writing position is calculated through the calibration, if the electromagnetic wave output from an RFID reader-writer is too powerful, the electromagnetic wave will flow also through an RFID tag embedded in another label. Consequentially, the RFID reader-writer receives a response from a plurality of RFID tags. In this case, it may happen that data cannot be written to a target RFID tag to which data is to be written or the same information is written to a plurality of RFID tags. In addition, an optimal writing position may not be found if the power of the electromagnetic wave output from an RFID reader-writer is too weak. As a result, the setting of optimal writing parameters may take a long time even if an automatic calibration is employed.

Further, in the conventional RFID tag writing system, when an AGC function is employed, data can be written to a defective RFID tag which will cause a fault in an actual application because of a receiving level (the response output of an RFID tag) being lower than a normal value. In this case, the defective RFID tag will be issued as a normally-functioning tag, thus causing a problem that a defective RFID tag cannot be distinguished from normally-functioning RFID tags during such an issuing process.

DETAILED DESCRIPTION

According to one embodiment, an RFID tag writing system has a conveying unit configured to convey a plurality of RFID tags, an antenna configured to transmit a first write signal towards the RFID tags and receive return signals generated by the RFID tags in response to the first write signal, and a controller configured to determine an intensity of a second write signal to be transmitted by the antenna based on intensities of the return signals.

Embodiments are described in detail below with reference to accompanying drawings of FIG. 1 to FIG. 10.

First Embodiment

Figure 1:
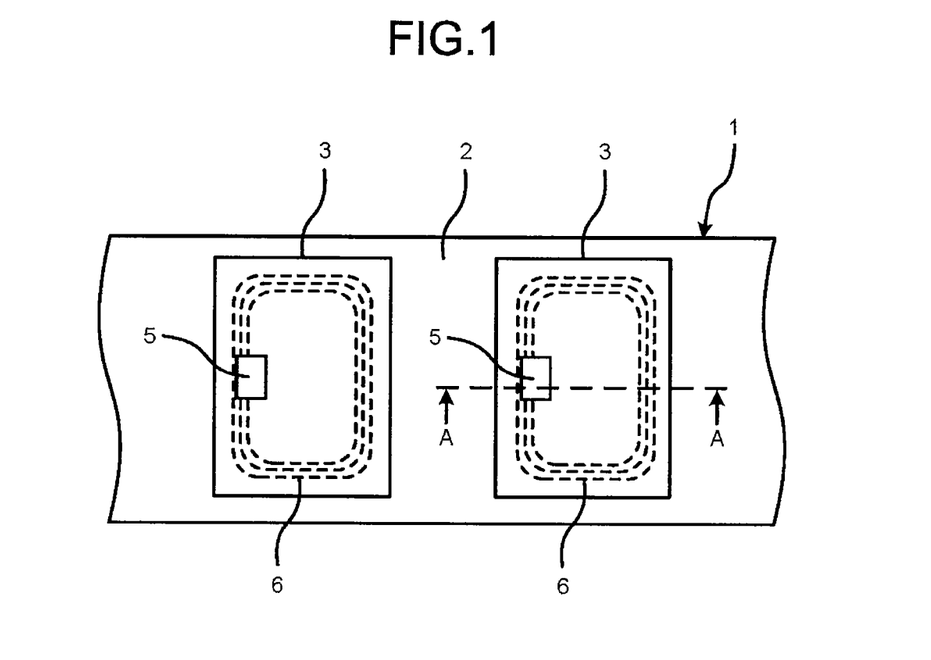
FIG. 1 is a schematic diagram of an RFID tag writing system according to a first embodiment.
Figure 2:
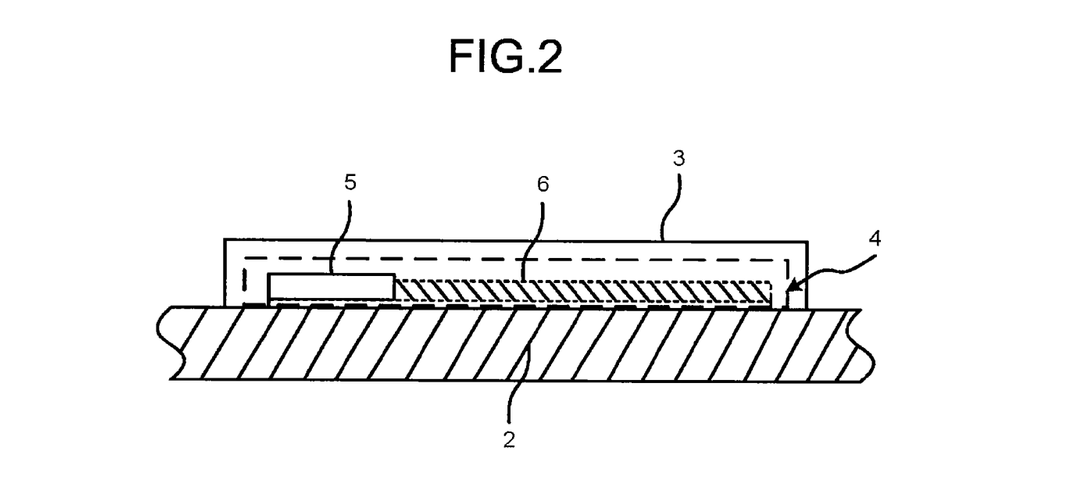
FIG. 2 is an enlarged view of the section of a line A-A shown in FIG. 1.

The RFID label paper 1 used in a first embodiment is described first with reference to FIG. 1 and FIG. 2.

As shown in FIG. 1, an RFID label paper 1 includes a strip-shaped mount 2 and a plurality of RFID labels 3 which are orderly arranged along one row in a longitudinal direction of the mount 2 and affixed on the surface of the mount 2 in a freely separable manner. As shown in FIG. 2, which is an enlarged view of the section of a line A-A shown in FIG. 1, in each RFID label 3, an RFID tag 4 (or RFID inlet) is contained in the back side (the side contacted with the mount 2) of a label sheet.

The RFID tag 4 is formed by arranging an IC chip 5 and an antenna 6 in a film. Moreover, the surface of the RFID label 3 is a surface on which visible information is printed.

A power source generating section, a demodulating section, a modulation section, a memory section, and a control section for controlling the aforementioned sections are arranged in the IC chip 5 of the RFID tag 4. The power source generating section supplies power source for each section of the IC chip 5 by rectifying and stabilizing a signal corresponding to an electric wave received by the antenna 6. The demodulating section demodulates the signal corresponding to the electric wave received by the antenna 6 and sends the demodulated signal to the control section. The modulation section modulates the data sent from the control section and sends a signal from the antenna 6. The control section writes the data demodulated by the demodulating section in the memory section or sends the data read from the memory section to the modulation section.

The memory section includes a setting area in which data is unrewritably recorded and a user area to which any data can be written. Moreover, an ID code is written in the setting area in advance, and the ID code is a specific code of the RFID tag 4 set for separately identifying each RFID tag 4.

Next, an RFID tag writing system is described with reference to FIG. 3-FIG. 5, and in the RFID tag writing system, tag data is written in RFID tags 4 of the RFID labels 3 that is included in the RFID label paper 1 orderly conveyed, using a wireless communication in a non-contact manner, and also label printing data is printed on the surface (printing surface) of the RFID label 3.

Figure 3:
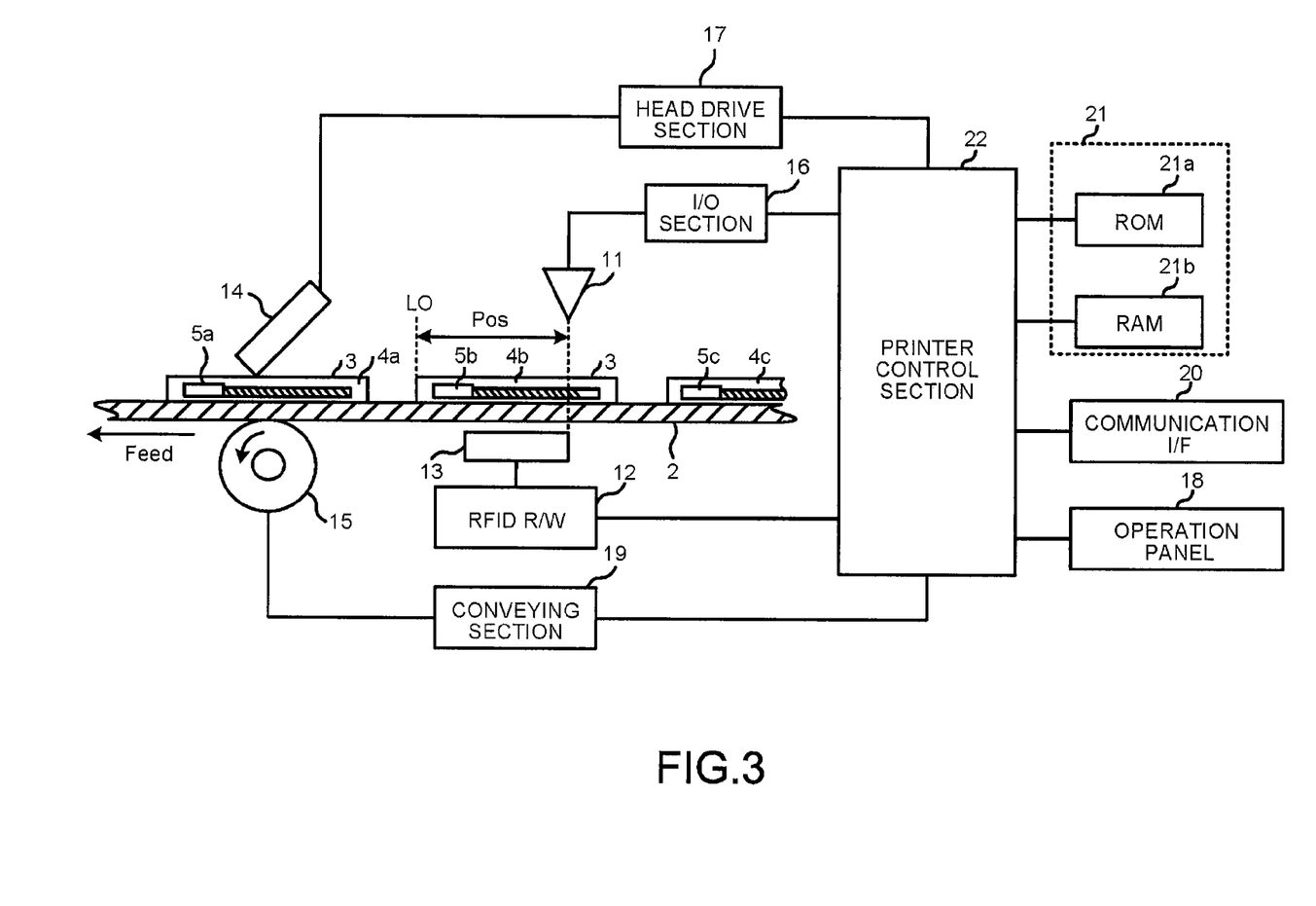
FIG. 3 is a block diagram illustrating a configuration of the RFID tag writing system according to the first embodiment.

FIG. 3 is a block diagram illustrating a configuration of an RFID tag writing system. For the RFID tag writing system, an RFID label paper 1 is placed on a label holder (not shown) in a rolled state. Moreover, the front end of the RFID label paper 1 is drawn out from the label holder and guided to a peeling section (not shown) along a specific conveyance path. In the peeling section, the RFID label 3 is peeled off from the mount 2. The RFID label 3 peeled off in the peeling section is discharged from a label outlet (not shown). The mount 2, from which the RFID label 3 is peeled off, is rolled up by a winding roller (not shown).

On the conveyance path from the label holder to the peeling section, a label sensor 11, the antenna 13 of the RFID reader-writer 12, and a printing head 14 are sequentially arranged from an upstream end of a conveyance direction (the feed direction shown in FIG. 3) (the end at which the label holder is provided) of the RFID label paper 1 with respect to the peeling section. The label sensor 11 and the printing head 14 are arranged above the conveyance path. On the contrary, the antenna 13 is arranged below the conveyance path. Further, a platen roller 15 is arranged at a position facing the printing head 14, and the conveyance passage is formed in between. Further, the antenna 13 may be arranged above the conveyance path.

The label sensor 11 detects the RFID label 3 arranged in the RFID label paper 1 drawn out from the label holder. For example, the label sensor 11 detects the RFID label 3 by optically detecting the edge of the front end of the RFID label 3 in the conveyance direction. A detection signal is provided to a printer control section 22, which will be described later, through an I/O section 16. The edge of the front end is set as a label origin LO, and the position of the RFID label 3 is defined using a position value Pos representing a distance from the label origin LO.

The antenna 13, which is arranged at a position nearest to the conveyance surface of the conveyance path, transmits an electric wave (or electromagnetic wave) and receives response waves generated from the RFID tags 4 (three successive RFID tags exemplarily denoted by symbols 4a, 4b, and 4c in FIG. 3) receiving the electric waves (or electromagnetic wave). Moreover, the antenna 13 has powerful directivity towards the conveyance surface directly above the antenna 13 (or directly beneath the antenna 13 when the antenna 13 is arranged above the conveyance path). The RFID reader-writer 12 writes the tag data into and reads the tag data from the RFID tag 4 existing in the mutual communication area of the electric wave (or electromagnetic wave) sent by the antenna 13. These reading and writing will be described later in detail The printing head 14, which is, for example, a thermal head, is driven by a head drive section 17 to print various kinds of visible information on the surface of the RFID label 3 positioned above the platen roller 15. Here, the printing head 14 and the head drive section 17 constitute a printing unit. Further, an ink ribbon may be inserted between the printing head 14 and the RFID label 3.

Further, the RFID tag writing system comprises an operation panel 18, a conveying section 19, a communication interface 20, a memory 21, and a printer control section 22.

Various keys and a display section are arranged on the operation panel 18 to set and calibrate various parameters.

The conveying section 19 functions as a drive source of an RFID label paper conveyance system of the platen roller 15 and the winding roller. The RFID label paper 1 is conveyed due to the function of the conveying section 19 along the conveyance path.

A host device, such as a personal computer, is connected to the communication interface 20 through a communication line. Moreover, an RFID label issuing job including writing the tag data to the RFID tag 4 of the RFID label 3 and printing label printing data (e.g. words) printed on the printing surface of the RFID label 3 is sent from the host device. The RFID label issuing job received from the host device is stored and maintained in the memory 21 before the job is finished. Further, the memory 21 is divided into a ROM area 21a dedicated for reading and a RAM area 21b which can be accessed randomly, and memory areas needed for the control of the printer, such as an area for temporarily storing the tag data edited based on the RFID label issuing job received from the host device and an area in which the image of label printing data is developed, are formed in the memory 21. Additionally, various parameters are set and calibrated by the host device, like the operation panel 18.

Figure 4:
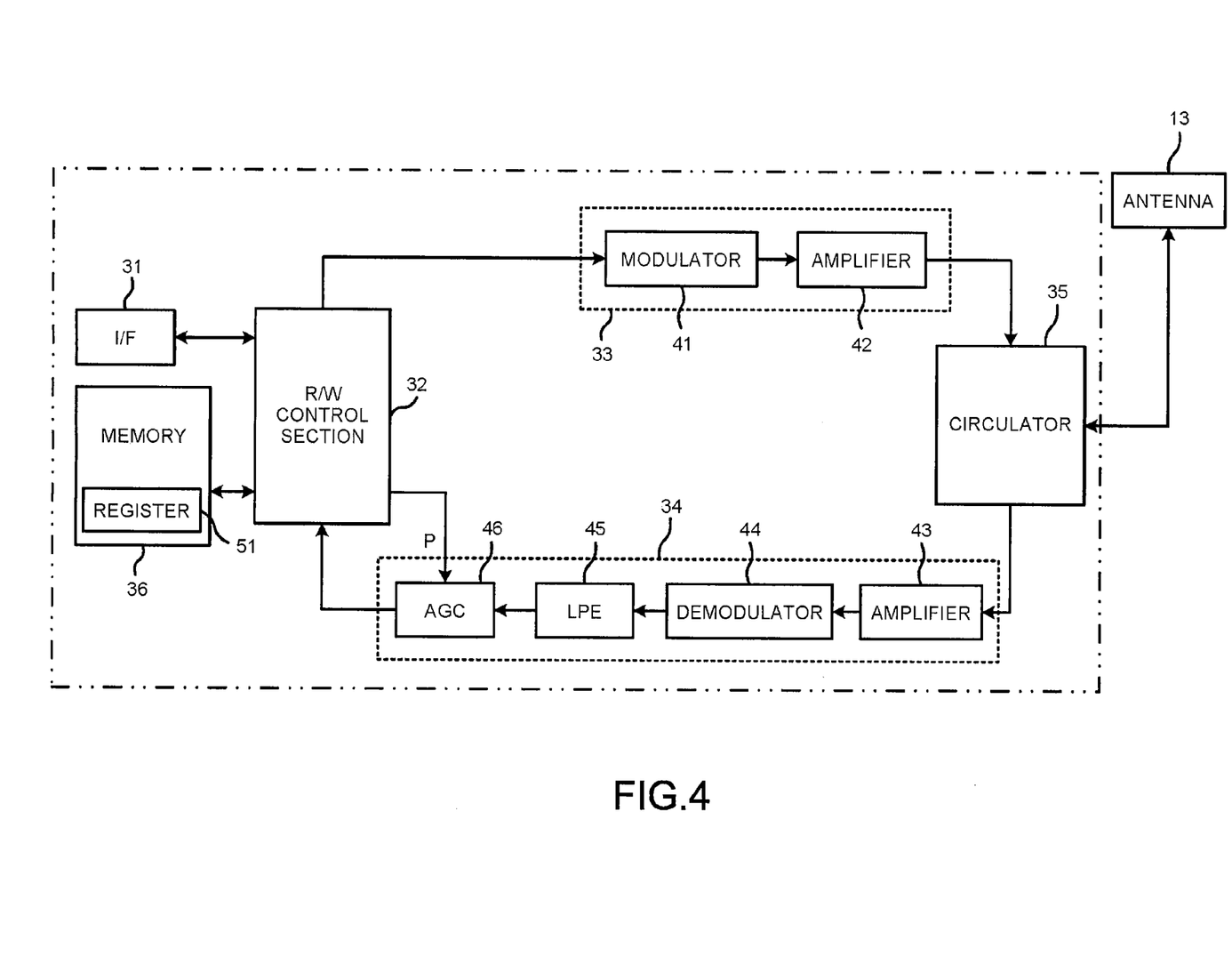
FIG. 4 is a block diagram illustrating a configuration of an RFID reader-writer included in the RFID tag writing system according to the first embodiment.

FIG. 4 is a block diagram illustrating a configuration of the RFID reader-writer 12. The RFID reader-writer 12 includes a printer control section 22, an interface 31 connected to the printer control section 22, a reader-writer control section 32, a sending processing section 33, a receiving processing section 34, a circulator 35, and a memory 36.

The sending processing section 33 includes a modulator 41 for modulating a specific conveyance wave using an analog data write signal output from the reader-writer control section 32 and an amplifier 42 for amplifying the signal modulated by the modulator 41. The signal amplified by the amplifier 42 is supplied to the antenna 13 through the circulator 35 and emitted from the antenna 13 as an electric wave (or electromagnetic wave). The circulator 35 has the following functions: outputting the signal input from the sending processing section 33 to the antenna 13, and outputting the signal input from the side of the antenna 13 to the receiving processing section 34. A signal corresponding to the electric wave (or electromagnetic wave) received from an RFID tags 4 existing in the mutual communication area is provided from the antenna 13 to the circulator 35.

The receiving processing section 34 includes an amplifier 43 for amplifying return data signal input from the circulator 35, a demodulator 44 for eliminating a specific conveyance wave component from the signals amplified by the amplifier 43 to demodulate the return analog data signal, a LPF (Low Pass Filter) 45 through which a specific low-frequency signal component of the return data signal demodulated by the demodulator 44 passes, and an AGC circuit 46 for adjusting gain (amplification ratio) by changing an intensity of the return data signal passing through the LPF 45 to a fixed proper intensity. The return data signal adjusted by the AGC circuit 46 to have the proper intensity is provided to the reader-writer control section 32.

The reader-writer control section 32 has the following functions: generating a data write signal according to a command from the printer control section 22 connected via the interface (I/F) 31, providing the sending processing section 33 with the generated data write signal, converting the return data signal provided by the receiving processing section 34 to data that can be recognized by the printer control section 22, and providing the converted data to the printer control section 22 through the interface 31. The reader-writer control section 32 further has the following functions: generating an AGC parameter P by which the gain of the AGC circuit 46 can be changed so that the intensity of the return data signal input from the AGC circuit 46 is a proper level, and providing the generated AGC parameter P to the AGC circuit 46.

The memory 36 has a ROM area dedicated for reading and a RAM area which can be accessed randomly. Moreover, a program (firmware) for controlling actions of the reader-writer control section 32 is stored in the ROM area. Further, a first-in-first-out (FIFO) function is provided in the RAM area.

Moreover, the AGC parameter P to be provided to the AGC circuit 46 from the reader-writer control section 32 is written in a register 51 sequentially. At this time, the reader-writer control section 32 generates an AGC parameter P to change the gain of the AGC circuit 46 so that the intensity of the data signal provided by the AGC circuit 46 is a proper level. Then, the AGC parameter P is provided to the AGC circuit 46 and written in the register 51. In this way, a return data signal generated in response to a data write signal by which data writing is successfully performed is adjusted by the AGC circuit 46 to have a proper level and is input to the reader-writer control section 32. Moreover, the data signal is converted to data that can be recognized by the printer control section 22 and provided to the printer control section 22 through the interface 31.

Here, the AGC parameter P is described further. As stated above, the antenna 13 of the RFID reader-writer 12 is arranged in the RFID label printer at a position nearest to the conveyance surface of the conveyance path for conveying the RFID label paper 1. Besides, the antenna 13 has a powerful directivity towards the conveyance surface directly above it. For this reason, the intensity of the return signal (response wave) received from the RFID tag 4 which has an normal wireless output level becomes higher, and therefore a distortion occurs easily. To avoid the distortion, the AGC circuit 46 is inserted and the intensity of the return signal is reduced to a proper level. Consequentially, the value of the AGC parameter P provided to the AGC circuit 46 is greater with respect to the return signal received from the RFID tag 4 which has the normal wireless output level. To the contrary, with respect to the return signal received from the RFID tag 4 which has a lower wireless output level than the normal value, the value of the AGC parameter P becomes lower in proportion to the wireless response output level of the RFID tag 4, because the intensity of the receiving signal is low. Therefore, the intensity of the return signal received from the RFID tag 4 can be estimated by referring to the AGC parameter P.

Figure 5:
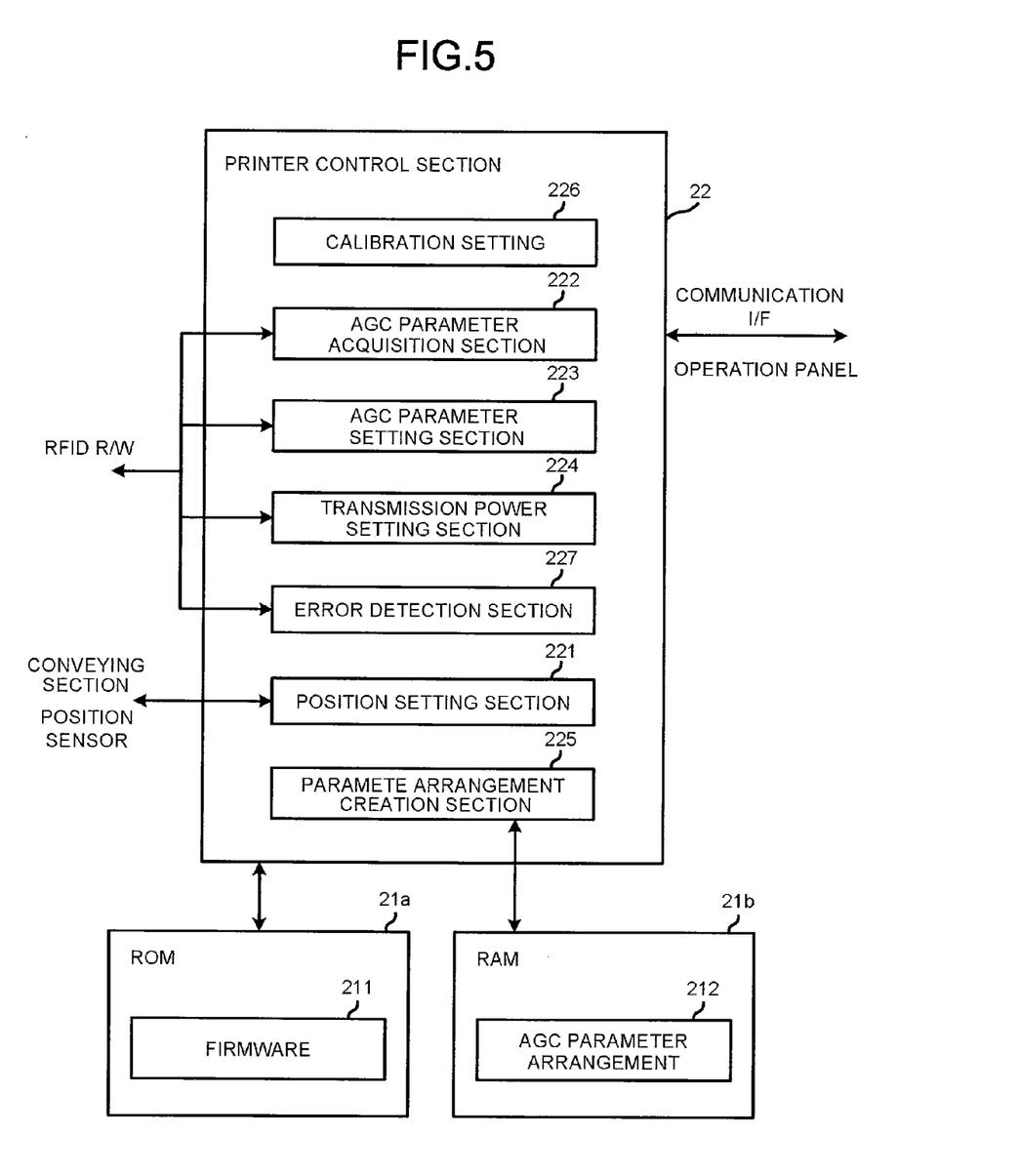
FIG. 5 is a diagram illustrating a configuration of a printer control section included in the RFID tag writing system according to the first embodiment.

FIG. 5 is a diagram illustrating a configuration of the printer control section 22. The printer control section 22 comprises a position setting section 221, an AGC parameter acquisition section 222, an AGC parameter setting section 223, a transmission power setting section 224, a parameter arrangement creation section 225, a calibration value setting section 226, and an error detection section 227. Further, functional blocks of the above-mentioned sections are stored in the ROM area 21*a* in the form of firmware 211. An AGC parameter arrangement 212 for setting an optimal calibration value is stored in the RAM area 21*b*.

The position setting section 221 causes the RFID label 3 to be conveyed from the label origin LO to a position a position value Pos away from the label origin LO in a Feed direction according to a specific feeding distance.

The AGC parameter acquisition section 222 causes the RFID label 3 to be located at a position a specific feeding distance away from the label origin LO, controls the antenna 13 to read the return signals from the RFID tags 4 at each position which is separated by the specific feeding distance at specific transmission output level, and acquires AGC parameter P for readable RFID tags 4.

The AGC parameter setting section 223 sets the AGC parameter P in the AGC section. The AGC parameter that the receiving level is the greatest level is set to be a first AGC parameter (P=AGC1) and the AGC parameter that the receiving level is a second greatest level is set to be a second AGC parameter (P=AGC2) in the readable RFID tags 4. Moreover, if the difference of the first and second AGC parameters is greater than a specified threshold value, then the substantially central value of the first and second AGC parameters is set as an AGC parameter (gain setting value P=Gp), and the writing to the RFID tag 4 is carried out at a fixed amplification ratio.

The transmission power setting section 224 changes the transmission output level to a specific value using the gain setting value Gp.

The parameter arrangement creation section 225 stores, in a condition that the writing is carried out successfully, a group consisting of a position of the RFID label 3 and a read AGC parameters (AGC1, AGC2) in an AGC parameter arrangement 212.

Moreover, the calibration value setting section 226 calculates the minimum value (AGC1_Min) of a first successfully written AGC parameters and the maximum value (AGC2_Max) of a second AGC parameters if a writing processing is successfully carried out at successive positions, and calculates a gain setting value Cg that is the substantially central value of the minimum value of the first AGC parameters and the maximum value of the second AGC parameters and the average position Cp of the successive positions as calibration values if the difference of the minimum value of a first successfully written AGC parameter group and the maximum value of a second AGC parameter group is greater than a specific threshold value.

The error detection section 227 detects an error in label printing and the reading/writing actions of the RFID tag 4 and stores an error record such as error occurrence times.

Figure 6:
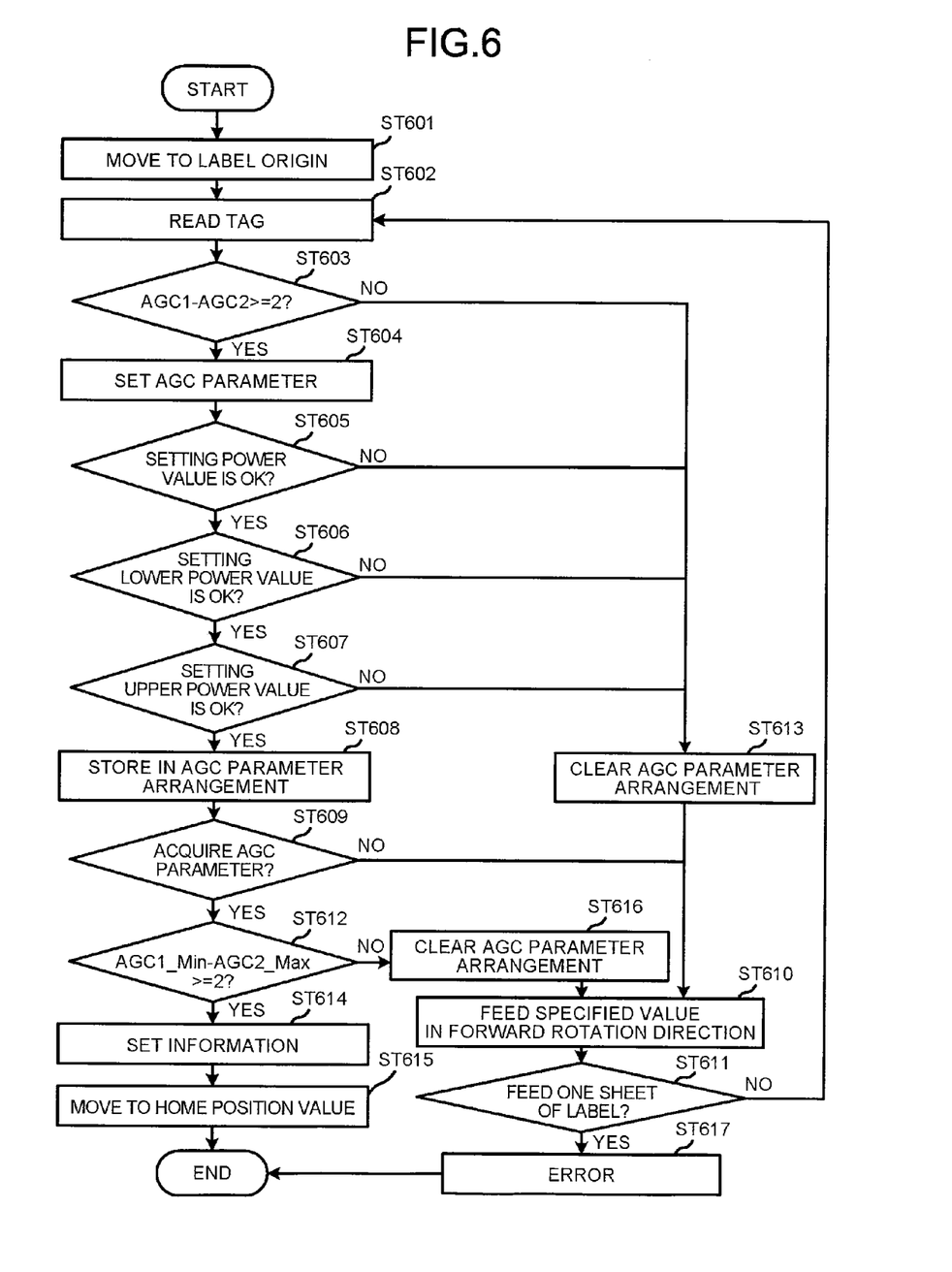
FIG. 6 is a flowchart diagram showing processes of a calibration performed by the RFID tag writing system according to the first embodiment.

The automatic calibration action of the RFID label printer having the configuration mentioned above is described with reference to the flowchart of FIG. 6. Besides, an AGC parameter arrangement storage method and a calibration value calculation method are described with reference to FIG. 7-FIG. 9.

First, an RFID tag 4 is conveyed to a label origin LO as a standard place in ACT ST601. Next, the RFID tags 4 in a readable range are read at a specific transmission power (tag reading) in ACT ST602. For a clear description, the RFID tags in the readable range are set to be denoted by symbols 4a, 4b and 4c, as shown in FIG. 3. Here, AGC parameter values are acquired when each of the RFID tags 4a, 4b, and 4c is read. The RFID tag 4b is directly above the antenna 13 and is therefore strong in response intensity and capable of acquiring a relatively greater AGC parameter. To the contrary, RFID tags 4a and 4c are weak in response intensity and are therefore capable of acquiring relatively smaller AGC parameters. To facilitate description, it is assumed that AGC parameters P are represented at ten grades of levels. Further, it is assumed that the size of the RFID label 3 is 12 mm and a feeding distance unit is 3 mm. Actually, the values can be set more finely.

For example, if the AGC parameter of the RFID tag 4b is 8, the AGC parameter of the RFID tag 4a is 2 and the AGC parameter of the RFID tag 4c is 3. Thus, the maximum AGC parameter is that of the RFID tag 4b, that is, 8, and therefore, the value 8 is set as AGC 1. Further, as the second greatest AGC parameter is that of the RFID tag 4c, that is, 3, and therefore, the value 3 is set as AGC 2. Further, if there is only one readable RFID label, then AGC2 is set to be 0.

The difference of AGC1 and AGC2 is calculated in ACT ST603. If the difference of AGC1 and AGC2 is greater than a given value (Yes in ACT ST603), then it is set in ACT ST604 that the substantially central value of AGC1 and AGC 2 is the gain setting value Gp of the AGC circuit 46, then, the following writing action is carried out. In the example, the gain setting value Gp is 5 or 6.

Further, the specific value of the difference of AGC1 and AGC2 refers to a value enabling the RFID tag 4b to be readable and RFID tag 4c to be unreadable when a gain setting value Gp is set in the AGC circuit 46. Here, the specific value is set to be 2 in the flowchart of FIG. 6. However, in the case where the level of the AGC parameters P is divided into 10 grades, if the difference of AGC1 and AGC2 is above 2 grades, the difference between the response intensities from the RFID tag is large enough, and the substantially central value of integers can be set as the gain setting value Gp.

The writing to RFID 4b is carried out at a specific transmission power in ACT ST605 (tag writing). If the writing is successfully carried out (Yes in ACT ST605), then ACT ST606 is executed to write to the RFID 4b at a level one grade lower than the level of the transmission output power (set lower limit) (tag writing). If the writing is successfully carried out (Yes in ACT ST606), then ACT ST607 is executed to write to the RFID 4b at a level one grade higher than the level of transmission output power (set upper limit) (tag writing).

Figure 7:
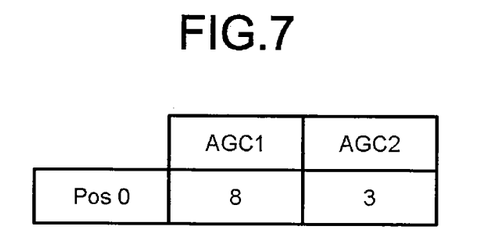
FIG. 7 is an example of the arrangement of AGC parameters at Pos 0 according to the first embodiment.

If the writing is successfully carried out in either of ACT ST605-ACT ST607, then it can be known that the tag writing is possible by a transmission power between the set lower limit and the set upper limit, therefore, in ACT ST608, the AGC1 and AGC2 acquired through the tag reading (ACT ST602) using the position values are stored in the AGC parameter arrangement 212. FIG. 7 shows an example of the AGC parameter arrangement 212 available when a tag is read using the position value 0 mm (Pos0: label origin LO). The value 8 is stored in the space 'AGC1', and the value 3 is stored in the space 'AGC2'.

Whether or not tags are successfully read at three successive positions is determined in ACT ST609 to ensure the margin of an optimal writing position. If there are no AGC parameters of three successive positions in the AGC parameter arrangement 212 (No in ACT ST609), then feeding is carried out in a forward rotation direction in a specific feeding distance (ACT ST610). If the RFID label 3 is not fed completely (No in ACT ST611), the flow returns to ACT ST602 to read and write a tag at the next feed position in the same way.

Figure 8:
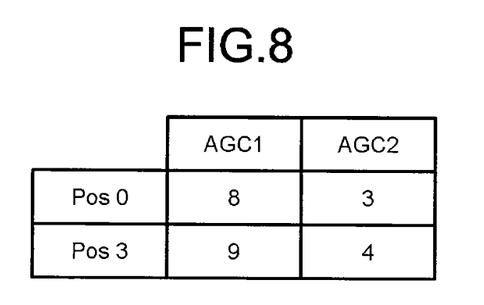
FIG. 8 is an example of the arrangement of AGC parameters at Pos 0 and Pos 3 according to the first embodiment.

FIG. 8 shows an example of the AGC parameter arrangement 212 when a tag is successfully read at the next position Pos 3 mm (Pos3) in the same way. AGC1 is 9 and AGC 2 is 4 in the tag reading described in ACT ST602.

Figure 9:
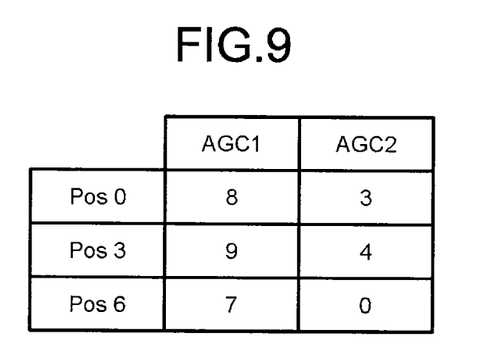
FIG. 9 is an example of the arrangement of AGC parameters at Pos 0, Pos 3, and Pos 6 according to the first embodiment.

Moreover, FIG. 9 shows an example of the AGC parameter arrangement 212 when a tag is successfully read at the next position Pos 6 mm (Pos6) in the same way. AGC1 is 7 and AGC 2 is 0 in the tag reading described in ACT ST602.

In this way, the flow proceeds to ACT ST612 if tags are written at three successive positions (Yes in ACT ST609). However, the AGC parameter arrangement 212 is cleared (ACT ST613) if the tag writing failed at least at one of the three successive positions (No in ST605, ST606, ST607), then feeding is carried out in a forward rotation direction in a specific feeding distance (ACT ST610).

The minimum value (AGC1_Min) in three values of AGC1 in the AGC parameter arrangement is calculated in ACT ST612. Further, the maximum value (AGC2_Max) in the three values of AGC2 is calculated.

Here, whether or not the difference of AGC1_Min and AGC2_Max is greater than a specific value (receiving level difference) is determined in the same way as used in ACT ST603. If the difference of AGC1_Min and AGC2_Max is greater than the specific value (receiving level difference: 2) (Yes in ACT ST612), the central position value Cpos and the substantially central value Cgp of the AGC1_Min and AGC2_Max stored in the AGC parameter arrangement 212 is determined to be calibration values, and the calibration ends (ACT ST614). Cpos=3 mm and Cgp=5 or 6 in the example shown in FIG. 9.

Then, the printing head is moved to the home position to prepare to carry out a printing operation (ACT ST615).

If the difference of AGC1_Min and AGC2_Max is smaller than the specific value (receiving level difference: 2) (No in ACT ST612), the AGC parameter arrangement is cleared (ACT ST616), and the feeding is carried out until the three successive tags are successfully written in the forward rotation direction.

If the whole length of a label is fed in ACT ST611 (Yes in ACT ST611), then an error 'no optimal position' is displayed (ACT ST617).

As stated above, according to the calibration described in the first embodiment, the calibration ends if three successive positions are found where tags can be successfully written. Thus, the time for calibration is short. Further, the optimal writing position and the optimal transmission power have a range so that a correct writing can be carried out even if the writing position or transmission power deviates from the optimal value.

Moreover, as the set AGC parameter is set to be the substantially central value of two top readable AGC parameter values, a communication with the RFID tag of the object to be written is enabled and a communication with other RFID tags is disenabled, which prevents error writing.

Second Embodiment

A system mode for carrying out system setting and an online mode for carrying out printing and writing can be set in the RFID tag writing system. A calibration operation is carried out in the system mode in general RFID tag writing system. However, in the embodiment described herein, a calibration operation may be carried out in an online mode as well. Moreover, the following embodiment is described according to which the calibration is automatically carried out again in the online mode without switching to the system mode when an error occurs in the writing process of a RFID tag. Thus the printing can be continued.

Figure 10:
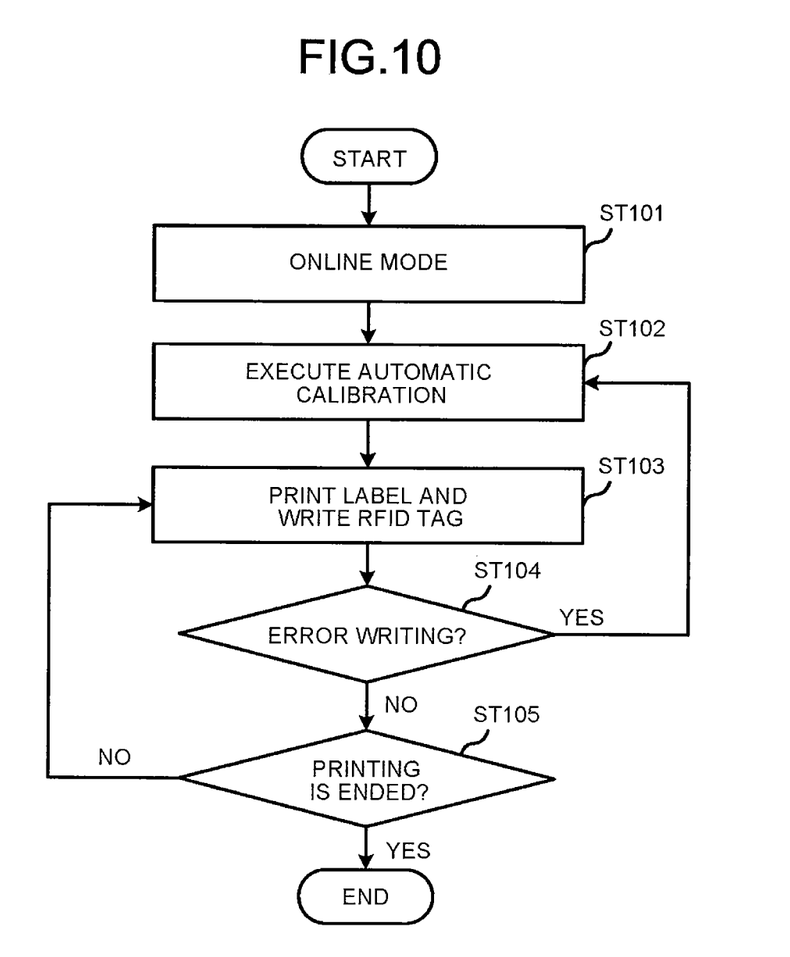
FIG. 10 is a flowchart showing processes of an automatic calibration in an online mode performed by the RFID tag writing system according to a second embodiment.

FIG. 10 is a flowchart of an automatic calibration operation carried out in an online mode. The online mode is set in ACT ST101. If the automatic calibration is needed, then the execution of the automatic calibration described in embodiment 1 is selected by operating a key from the operation panel 18. After the automatic calibration is executed (ACT ST102), a label is printed and the writing to the RFID tag 4 is carried out (ACT ST103).

In the writing action, the writing action is stopped transiently if writing error occurs a specific number of times (Yes in ACT ST104), and an automatic calibration is carried out again at the stopped position (ACT ST102). The writing is resumed if the calibration ends (ACT ST103). Further, the detection of writing error is carried out by an error detection section 227. The printing action ends after the desired printing is ended.

Further, in the first embodiment, the calibration ends if the tag writing is found at three successive positions and a calibration value is determined. Therefore, it is possible to obtain an optimal point with a wide margin through a further feeding. Thus, it is unnecessary to return to the label origin LO in the next automatic calibration, feeding may be carried out in the forward rotation direction from a position slightly back to the position value calculated in the initial calibration, and then a calibration operation is carried out.

Therefore, according to the second embodiment, a printing action and a calibration may be carried out synchronously in the online mode.

As stated above, in accordance with the embodiment, calibration values in a margin can be obtained in a short time. Moreover, error writing can be prevented.

While certain embodiments have been described, these embodiments have been presented by way of example only, and are not intended to limit the scope of the inventions.

For example, the initially set transmission output power value may be changed if no calibration value is found in embodiment 1, and the same calibration is carried out until a calibration value is found.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An RFID tag writing system comprising:
a conveying unit configured to convey a plurality of RFID tags;
an antenna configured to transmit a first write signal towards the RFID tags and receive return signals generated by the RFID tags in response to the first write signal; and
a controller configured to determine an intensity of a second write signal to be transmitted by the antenna based on intensities of the return signals,
determine optimum positions of the RFID tags toward which the second write signal is to be transmitted based on the intensities of the return signals, and control the conveying unit to convey the RFID tags to the optimum positions and the antenna to transmit the second write signal of the determined intensity to the RFID tags at the optimum positions;
wherein if a difference between a largest of the intensities of the return signals and a second largest of the intensities of the return signals is more than a predetermined value, the controller determines the intensity of the second write signal to be different from the intensity of the first write signal.

2. The RFID tag writing system according to claim 1, further comprising:
a printing unit configured to print an image on each of the RFID tags.

3. The RFID tag writing system according to claim 1, wherein the controller determines the intensity of the second write signal to be lower than an intensity of the first write signal.

4. The RFID tag writing system according to claim 1, wherein if the difference between the largest of the intensities of the return signals and the second largest of the intensities of the return signals is less than the predetermined value, the controller determines that the RFID tag closest to the antenna cannot be written at a position thereof.

5. The RFID tag writing system according to claim 1, wherein the controller is configured to determine the optimum positions of the RFID tags based on the intensities of the return signals generated with respect to plural positions at which the RFID tags are located.

6. An RFID tag writing system comprising:
a conveying unit configured to convey a plurality of RFID tags;
an antenna configured to transmit a first write signal towards the RFID tags and receive return signals generated by the RFID tags in response to the first write signal; and
a controller configured to determine an intensity of a second write signal to be transmitted by the antenna based on intensities of the return signals,
determine optimum positions of the RFID tags toward which the second write signal is to be transmitted based on the intensities of the return signals, and control the conveying unit to convey the RFID tags to the optimum positions and the antenna to optimum positions;
wherein if a difference between a minimum of largest intensities of the return signals and a maximum of second largest intensities of the return signals is more than a predetermined value, the controller determines the intensity of the second write signal to be different from the intensity of the first write signal.

7. The RFID tag writing system according to claim 1, wherein
the controller is configured to determine the intensity of the second write signal based on the intensities of the return signals generated with respect to plural positions at which the RFID tags are located.

8. A method for writing data in a RFID tag comprising:
conveying a plurality of RFID tags;
transmitting a first write signal from an antenna towards the RFID tags; receiving return signals generated by the RFID tags in response to the first write signal;
determining an intensity of a second write signal to be transmitted by the antenna based on intensities of the return signals;
determining optimum positions of the RFID tags towards which the second write signal is to be transmitted based on the intensities of the return signals; conveying the RFID tags to the optimum positions; and transmitting the second write signal of the determined intensity from the antenna towards the RFID tags at the optimum positions;

wherein if a difference between a largest of the intensities of the return signals and a second largest of the intensities of the return signals is more than a predetermined value, the intensity of the second write signal is determined to be different from the first write signal.

9. The method according to claim 8, further comprising: printing an image on each of the RFID tags.

10. The method according to claim 8, wherein
the intensity of the second write signal is determined to be lower than an intensity of the first write signal.

11. The method according to claim 9, wherein
the optimum positions of the RFID tags are determined based on the intensities of the return signals generated with respect to plural positions at which the RFID tags are located.

12. The method according to claim 11, wherein
if a difference between a minimum of the largest intensities of the return signals and a maximum of the second largest intensities of the return signals is more than a predetermined value, the intensity of the second write signal is determined to be different from the intensity of the first write signal.

13. The method according to claim 8, wherein
the intensity of the second write signal is determined based on the intensities of the return signals generated with respect to plural positions at which the RFID tags are located.

* * * * *